(12) United States Patent
Hof et al.

(10) Patent No.: US 11,169,043 B2
(45) Date of Patent: Nov. 9, 2021

(54) DRIVE APPARATUS FOR A BALANCING MACHINE AND A BALANCING MACHINE

(71) Applicant: Schenck RoTec GmbH, Darmstadt (DE)

(72) Inventors: Nicole Hof, Rossdorf (DE); Paul Koch, Griesheim (DE)

(73) Assignee: SCHENCK ROTEC GMBH, Darmstadt (DE)

( * ) Notice: Subject to any disclaimer, the term of this patent is extended or adjusted under 35 U.S.C. 154(b) by 221 days.

(21) Appl. No.: 16/038,333

(22) Filed: Jul. 18, 2018

(65) Prior Publication Data
US 2019/0041289 A1    Feb. 7, 2019

(30) Foreign Application Priority Data

Aug. 4, 2017   (DE) .................... 10 2017 007 328.7

(51) Int. Cl.
| | |
|---|---|
| *G01M 1/06* | (2006.01) |
| *F16H 7/00* | (2006.01) |
| *G01M 1/02* | (2006.01) |
| *G01M 1/30* | (2006.01) |

(Continued)

(52) U.S. Cl.
CPC ............... *G01M 1/02* (2013.01); *G01M 1/04* (2013.01); *G01M 1/06* (2013.01); *G01M 1/30* (2013.01); *H02K 15/165* (2013.01)

(58) Field of Classification Search
CPC ............ G01M 1/02; G01M 1/04; G01M 1/30; H02K 15/165; Y10S 29/901
See application file for complete search history.

(56) References Cited

U.S. PATENT DOCUMENTS

| | | | | |
|---|---|---|---|---|
| 1,976,588 A | * | 10/1934 | Thearle | ................ H02K 15/165 310/51 |
| 2,464,662 A | | 3/1949 | Young | |
| 3,589,203 A | * | 6/1971 | Hines | ....................... F16H 7/02 474/121 |

(Continued)

FOREIGN PATENT DOCUMENTS

| | | |
|---|---|---|
| JP | 2001-033339 A | 2/2001 |
| JP | 2001033339 A * | 2/2001 |
| WO | WO-2017127924 A1 * 8/2017 | ........... E21B 19/164 |

OTHER PUBLICATIONS

Machine translation of Japanese Reference JP 2001033339 A dated Feb. 9, 2001 (7 pages).

*Primary Examiner* — Sara Addisu
(74) *Attorney, Agent, or Firm* — Collard & Roe, P.C.

(57) ABSTRACT

A balancing machine drive apparatus for driving rotational movement of a workpiece rotatably mounted about a rotational axis by a looping belt includes a frame at least partially surrounding, transaxially to the rotational axis, a workpiece mounting position and having an opening closable by an arch and through which the mounting position is accessible, the drive apparatus including guide devices on the frame and/or arch to guide the belt such that, when the arch is closed, the belt winds at least partially around a workpiece in the mounting position on a cylindrical circumferential workpiece region, and a drive device for the belt. The arch is held on the frame so as to be movable between open and closed positions. A balancing machine for balancing a workpiece includes a mounting apparatus in order to rotatably mount the workpiece about a rotational axis in a mounting position, and the drive apparatus.

9 Claims, 4 Drawing Sheets

(51) Int. Cl.
*H02K 15/16* (2006.01)
*G01M 1/04* (2006.01)

(56) References Cited

U.S. PATENT DOCUMENTS

| | | | | | |
|---|---|---|---|---|---|
| 3,835,740 | A | * | 9/1974 | Peytavin | B22D 11/126 82/47 |
| 3,895,536 | A | * | 7/1975 | Behm | G01M 1/04 73/462 |
| 4,012,973 | A | * | 3/1977 | Tupper | B26D 1/02 82/82 |
| 4,417,491 | A | * | 11/1983 | Uehara | B23B 13/00 414/18 |
| 4,517,866 | A | * | 5/1985 | Bazuin | B23Q 1/76 451/408 |
| 4,712,425 | A | * | 12/1987 | Augendre | G01M 1/06 73/460 |
| 5,056,389 | A | * | 10/1991 | Johnstead | B23B 3/26 409/177 |
| 5,058,429 | A | * | 10/1991 | Fietzke | G01M 1/04 73/475 |
| 5,235,854 | A | * | 8/1993 | Hines | G01M 1/06 73/462 |
| 5,441,437 | A | * | 8/1995 | Hulstedt | B24B 17/00 451/1 |
| 7,392,701 | B2 | * | 7/2008 | Turner | G01M 1/24 73/462 |
| 7,682,272 | B2 | * | 3/2010 | Park | H02K 15/165 474/137 |
| 2005/0115371 | A1 | * | 6/2005 | Ogawa | B23D 21/04 82/101 |
| 2008/0191646 | A1 | | 8/2008 | Park | |
| 2008/0260311 | A1 | * | 10/2008 | Thelen | G01M 1/04 384/438 |
| 2011/0221191 | A1 | * | 9/2011 | Fiset | H02K 7/20 290/5 |
| 2013/0047803 | A1 | * | 2/2013 | Wang | B23D 45/126 82/59 |
| 2015/0040731 | A1 | * | 2/2015 | Moherman | B23B 5/161 82/113 |

* cited by examiner

DRIVE APPARATUS FOR A BALANCING MACHINE AND A BALANCING MACHINE

CROSS REFERENCE TO RELATED APPLICATIONS

Applicant claims priority under 35 U.S.C. § 119 of German Application No. 10 2017 007 328.7 filed Aug. 4, 2017, the disclosure of which is incorporated by reference.

BACKGROUND OF THE INVENTION

1. Field of the Invention

The invention relates to a drive apparatus for a balancing machine for driving rotational movement of a workpiece, which is rotatably mounted about an axis of rotation, by means of a looping belt, the drive apparatus comprising a frame which, transaxially to the axis of rotation, surrounds a mounting position for the workpiece at least in part, the frame having an opening which can be closed by means of an arch and through which the mounting position is accessible, the drive apparatus comprising guide devices arranged on the frame and/or the arch, in order to guide the belt such that, when the arch is closed, the belt winds around a workpiece in the mounting position on a cylindrical circumferential region of said workpiece at least in part, and the drive apparatus further comprising a drive device for the belt.

The invention also relates to a balancing machine for balancing a workpiece, comprising a mounting apparatus in order to rotatably mount the workpiece about an axis of rotation in a mounting position, and comprising a drive apparatus.

2. Description of the Related Art

A wide range of balancing machines for balancing workpieces are already known in the prior art. A balancing machine of the type in question is described in JP 2001-33339 A, for example. In general, the workpiece to be balanced, often also referred to as the rotor, is rotated by means of a suitable drive and examined for unbalanced mass using sensors. Various drive approaches are also known, e.g. driven shafts that are connected to the rotor, or looping belts that act on an outer circumference of the rotor.

In the case of "belt drives", there are known systems in which the belt is guided tangentially to the rotor and accordingly rests against the rotor in a more or less selective manner, i.e. only over a very small angle range of the circumference of the rotor in question. In the case of another class of known belt drives, the belt winds around the rotor and accordingly rests against the rotor over a large range of the circumference of the rotor. The invention concerns only the latter class of belt drives.

In the case of drives having encircling belts, i.e. those of the type in question, the problem often arises that the belt winds around up to half of the circumference of the workpiece and gets in the way when the workpiece is changed. The prior art therefore discloses belt drives in which the belt can be placed around the workpiece and lifted from the workpiece by means of a pivotable arm.

It is generally desirable to balance as many workpieces as possible in the shortest time possible and to the highest possible degree of precision, it being strived at the same time to be able to use the same machine for the widest possible range of different workpieces. This places high demands on variance, stability, reproducibility of the adjustment options, handling and ergonomics, which requirements have not previously been adequately met by existing systems.

SUMMARY OF THE INVENTION

The object of the invention is to improve at least a few of these aspects in comparison with known solutions.

Said object is achieved according to the invention by a drive apparatus for a balancing machine for driving rotational movement of a workpiece, which is rotatably mounted about an axis of rotation, by means of a looping belt, the drive apparatus comprising a frame which, transaxially to the axis of rotation, surrounds a mounting position for the workpiece at least in part, the frame having an opening which can be closed by means of an arch and through which the mounting position is accessible, the drive apparatus comprising guide devices arranged on the frame and/or the arch, in order to guide the belt such that, when the arch is closed, the belt winds around a workpiece in the mounting position on a cylindrical circumferential region of said workpiece at least in part, and the drive apparatus further comprising a drive device for the belt, the drive apparatus according to the invention having been developed in that the arch is held on the frame so as to be movable between an open position and a closed position.

The belt can generally be removed for replacement purposes. The invention therefore also expressly relates, in addition to an operational drive apparatus, to a drive apparatus, according to the invention, of which the belt has been removed.

One advantage of the invention is that the movable arch according to the invention does not have to be lifted, in contrast with known pivoting or hinged arches. In particular, the invention also makes it easy to operate the arch, requires little effort and involves short operating distances. This considerably improves the ergonomics and the cycle time for changing the workpiece.

A preferred development of the invention is characterized in that the mass distribution of the arch and all the components of the drive apparatus that are movable together with the arch are balanced such that the gravitational torque acting on account of the mass distribution is not sufficient to overcome a frictional force acting counter to movement of the arch.

In this connection, friction or frictional force is understood in particular to refer to static friction when the arch is in any stationary position and/or sliding friction when the arch is moved.

This advantageously prevents the arch from moving unintentionally and/or uncontrollably and/or independently and increases operational safety. At the same time, this is also achieved without damping or braking elements that increase the effort required to move the arch, to the benefit of the ergonomics.

The guide devices are each designed, for example, as guide rollers for the belt. If the guide rollers also comprise retaining devices, e.g. guide plates, the belt is effectively prevented from jumping off the guide rollers, and the operation of the drive apparatus according to the invention is further simplified.

If a first of the guide devices is arranged on the arch, and a second of the guide devices is arranged on the frame, the belt used as intended in particular being guided over the workpiece, mounted as intended, between the first guide device and the second guide device when the arch is closed, the belt thus advantageously clears the mounting position for the component when the arch is opened, without further intervention, such that a component can be readily inserted in or removed from the mounting position. When the arch is closed, the belt is then placed around the component, without further intervention, such that the drive apparatus according to the invention is operational as soon as the arch is closed.

A locking device, for example, is provided for fixing the closed arch. A both particularly simply constructed and easy-to-handle locking device comprises an eccentric tension lever in order to releasably frictionally fix the closed arch on the frame.

For the purpose of adjustment to different rotor dimensions, a drive apparatus according to the invention advantageously comprises a tensioning device for the belt. As a result, a belt of a specified length can be used for a wide range of rotor dimensions such that the set-up time for changing the belt is no longer required when the workpiece is changed.

The tensioning device is preferably arranged on the frame so as to limit the mass on the arch, which mass would otherwise have to be moved together with the arch when it is opened and closed. This also improves the ergonomics and reduces cycle times.

For the quality of the balancing results, it has proven to be particularly advantageous for the belt to extend vertically from below over the workpiece and to run vertically back downwards from the workpiece on the other side. In order to make it possible to guide the belt in this manner for different workpiece diameters, the second guide device is advantageously arranged on the frame such that its position can be changed. The first guide device is arranged, for example, on the arch such that its position can be changed. Additionally or alternatively, the closed position of the arch is particularly advantageously designed so as to be adjustable. In this case, a stop of which the position can be changed, for example, makes it possible to reproduce the closed position.

A particularly preferred embodiment of the invention is characterized in that an arc-shaped sliding guide for the arch is provided on the frame. This allows a particularly short operating distance for the arch. Furthermore, a particularly compact design of the drive apparatus according to the invention having minimized installation space requirements is made possible because the arch overlaps the frame significantly in every position. Furthermore, a further advantage is that, when the arch is open, hardly any additional installation space, or none at all, is required in comparison with when the arch is closed.

The arc-shaped sliding guide and an accordingly curved basic shape of the arch result in a centre of gravity of the arch that is close to the centre of the circular path. On account of the resultant reduced leverage, and irrespective of the actual weight of the arch, only low gravitational torques act, which can be even further reduced by means of a balanced mass distribution on the arch. The invention thus makes it possible for the friction of even a very smooth-running mounting of the arch on the sliding guide to be sufficient to effectively prevent the arch from moving unintentionally and independently. This results in an intrinsic safety torque with regard to injuries, in particular crush injuries, even without corresponding safety measures, such as damping elements or other braking devices on the arch.

An embodiment of the invention that is particularly advantageous in this regard is characterized in that the frame and the arch surround the mounting position for the workpiece substantially concentrically with the axis of rotation.

If a further guide device is arranged on the arch, the first guide device and the further guide device in particular being arranged on opposite regions of the arch, it is also made possible, in addition to the mentioned advantages, for the belt to be carried along by the further guide device and loosely tensioned when the arch is opened. This prevents the belt from sagging excessively, and effectively prevents the belt from unintentionally getting caught when the arch is moved or any other kind of interruption to the guiding of the belt from occurring. This further simplifies the handling and further reduces the cycle time because it is no longer necessary to manually intervene to correct the guiding of the belt.

From geometric points of view, it has proven to be particularly advantageous, in the case of the described concentric arrangement, for the opening in the frame to correspond to between 100° and 130° of the transaxial periphery of the axis of rotation in order to allow the largest possible opening width and thus the largest possible maximum workpiece diameter. It is also advantageous for the closed position of the arch to be designed so as to be adjustable within an adjustment range, which corresponds to at least 45° of the transaxial periphery of the axis of rotation. This allows the guiding of the belt to be sufficiently adjustable in order to be able to process both workpieces that have a maximum diameter or circumference determined by the opening width and workpieces that have the smallest possible diameter or circumference.

The object of the invention is also achieved by a balancing machine for balancing a workpiece, comprising a mounting apparatus in order to rotatably mount the workpiece about an axis of rotation in a mounting position, and comprising a drive apparatus according to the invention.

The invention is made more variable if the balancing machine comprises a machine bed on which the drive apparatus is arranged so as to be longitudinally axially movable. This makes it possible to also process irregular workpieces that only have a cylindrical circumference in portions. In particular, for this purpose the drive apparatus is moved longitudinally axially on the machine bed and oriented such that the belt can act on a cylindrical portion of the workpiece. Further variability is also achieved if the mounting apparatus is also arranged so as to be longitudinally axially movable on the machine bed on at least one side in order to adjust, for example, the mounting position for the workpiece to the overall length of the workpiece.

Particularly synergistic advantages emerge from the invention if the balancing machine according to the invention further comprises a protective case, which surrounds at least the mounting apparatus, the mounting position for the workpiece and the drive apparatus and which has a loading and unloading opening, and a cover device for covering the loading and unloading opening. In this case, as a result of the described compact design of the drive apparatus which the invention makes possible, the protective case and in particular the cover device are accordingly also intended to be compact. This improves the ergonomics of a balancing machine according to the invention and reduces the cycle time during material changes, which of course also requires the cover device to be opened and closed. Since the invention also makes it possible to design the drive apparatus without the open arch requiring additional installation space, the cover device is prevented from colliding with the open arch, and it is therefore possible to dispense with corresponding safety or barrier devices.

BRIEF DESCRIPTION OF THE DRAWINGS

The invention will be described below in more detail on the basis of an embodiment of the invention shown in the drawings, in which.

DETAILED DESCRIPTION OF PREFERRED EMBODIMENTS

Figure 1:
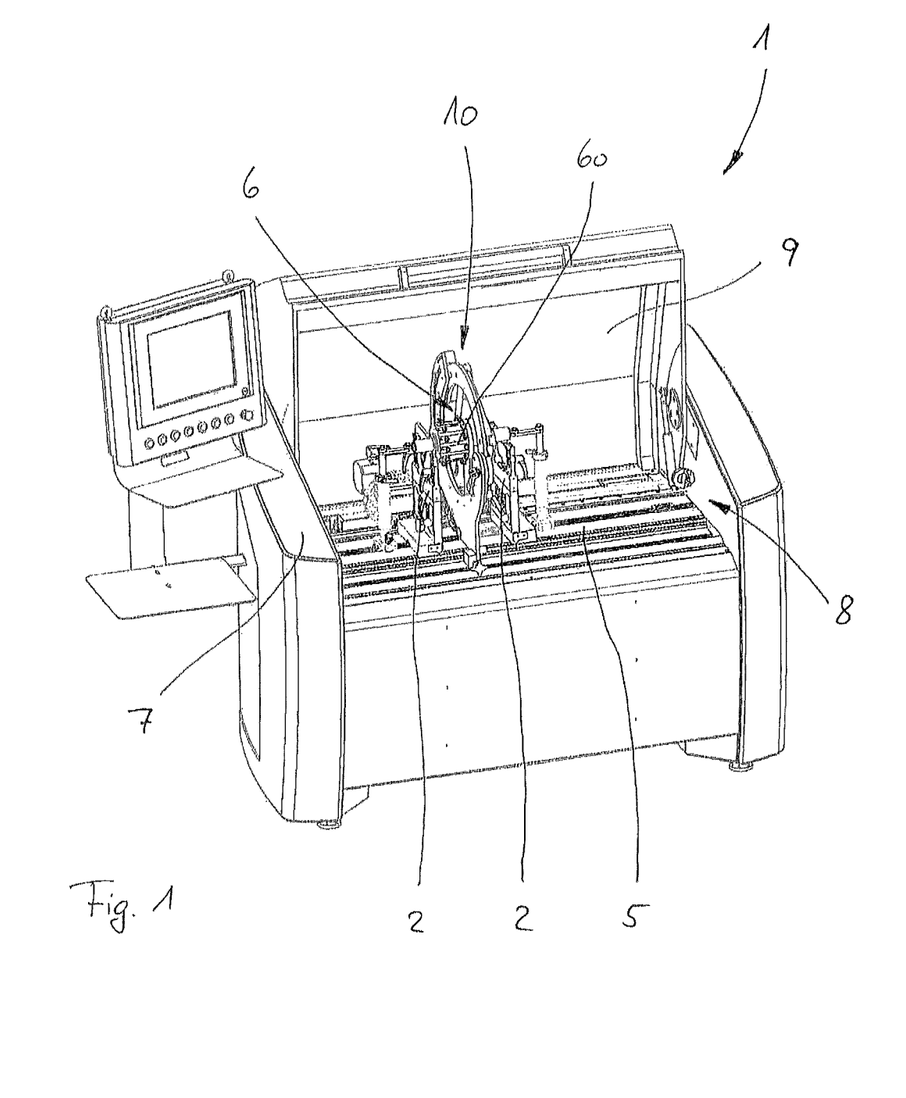
FIG. 1 shows a view of a balancing machine according to the invention comprising a drive apparatus according to the invention.

FIG. 1 shows a schematic view of a balancing machine 1 according to the invention.

The balancing machine 1 comprises a workspace 8 in which two mounting devices 2 for rotatably mounting a rotor 60 in a mounting position 6 are arranged on a machine bed 5. By way of example, a rotor 60 is also shown, which is shown as a wheel hub, without this limiting the invention. The mounting devices 2 can be moved on the machine bed 5 axially in parallel with the rotor 60 arranged as intended, in order to be able to carry out adjustments to different rotors 60 of different lengths.

A drive apparatus 10 according to the invention is arranged between the two mounting devices 2 in order to rotate a rotor 60, mounted as intended, in a controlled manner in order to check for unbalanced mass. Sensor, control and analysis devices required for this purpose are also part of the balancing apparatus 1 according to the invention and are generally known. Said devices will therefore not be discussed in detail, for the sake of a concise description of the invention.

The drive apparatus 10 according to the invention is designed as per the principle of the winding belt drive. In this case, a drive belt 4 of the drive apparatus 10 acts on a portion of the rotor, which portion has to be cylindrical. In order to be able to process different rotors 60, which may also have very complex shapes and of which only portions have to have cylindrical outer contours, the drive apparatus 10 is preferably also arranged so as to be movable along the machine bed 5.

The workspace 8 is surrounded by a protective case 7 and is closed by a protective hood 9 for the operation of the balancing machine. As is shown in FIG. 1, the open protective hood 9 uncovers a generous loading and unloading opening in the protective case 7 in order to easily place rotors 60 in the provided mounting position 6 or remove said rotors therefrom, and in order to adjust the various elements of the balancing machine 1 according to the invention to a specific rotor 60. The drive apparatus 10 of the balancing machine 1 according to the invention, which apparatus is inventive in its own respect, advantageously allows the construction of a protective hood 9 which is smaller and/or lighter than in the prior art, and a smaller opening distance of said hood.

Figure 2:
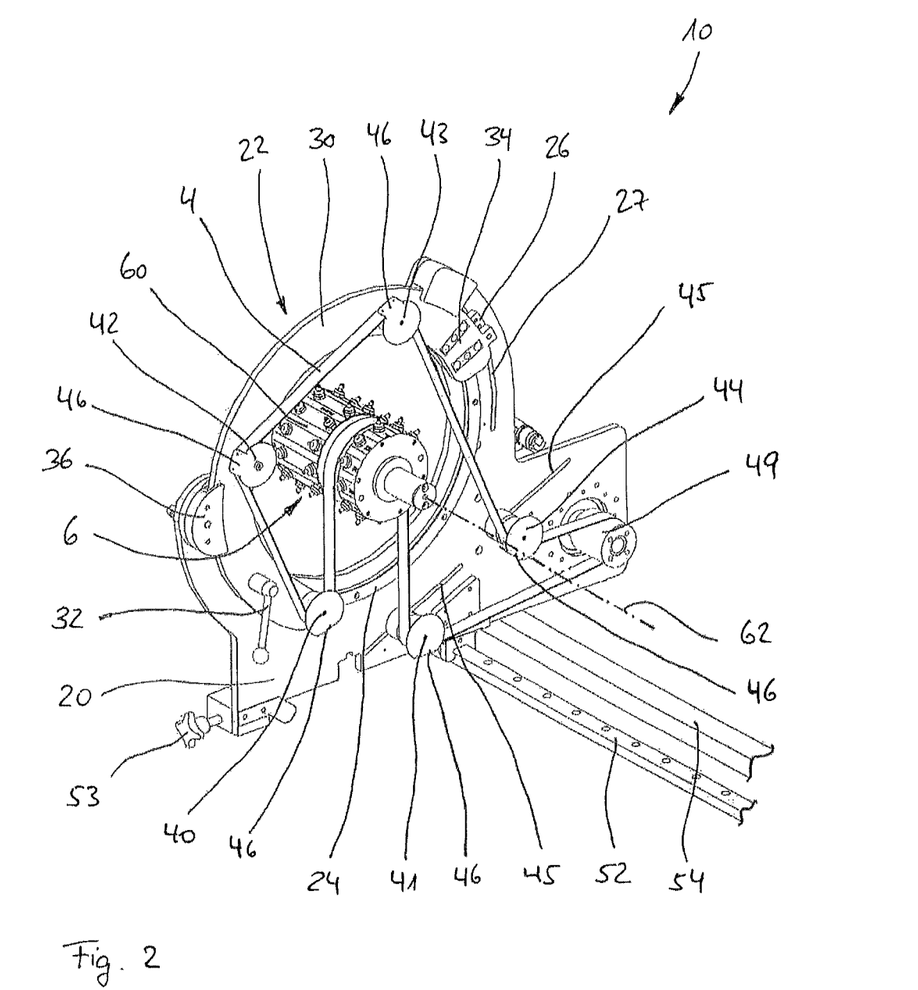
FIG. 2 shows a three-dimensional view of a drive apparatus according to the invention in which the belt has been placed thereon, a workpiece has been positioned, and the arch has been closed, from a first point of view.
Figure 3:
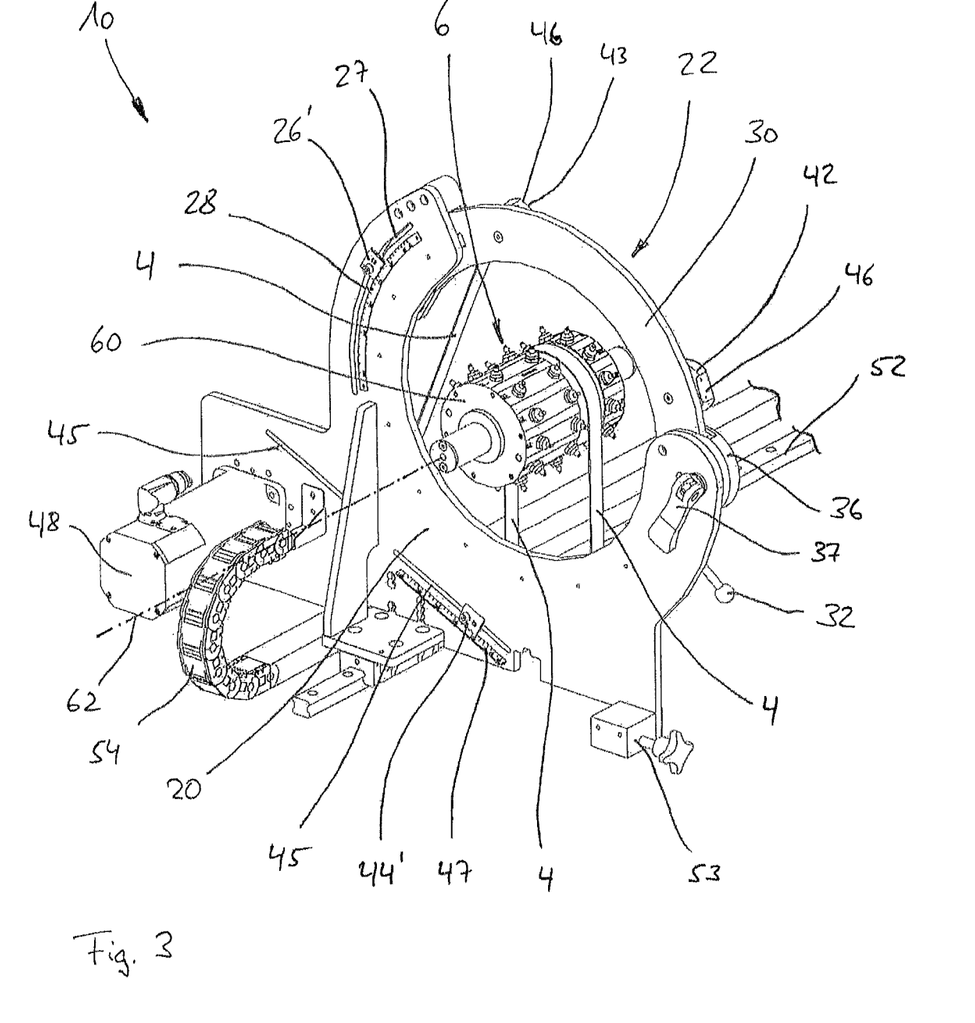
FIG. 3 shows the drive apparatus according to the invention shown in FIG. 2, from a second point of view.

Each of FIGS. 2 and 3 is a perspective view of the drive apparatus 10 according to the invention of the balancing machine 1 according to the invention from two different points of view, which machine is given by way of example.

The drive apparatus 10 comprises a frame 20 which surrounds a mounting position 6 for a workpiece to be balanced. A rotor 60 is also shown here by way of example. An axis of rotation 62 of the rotor 60 is also shown schematically, the frame 20 surrounding part of the rotor 60 transversely to the axis of rotation 62.

The frame 20 has an opening 22 in order to place a rotor 60 in the mounting position 6 provided therefor, which position is defined crucially by the mounting devices 2 and is surrounded by the frame 20, or in order to remove said rotor from said mounting position.

An arch 30 is provided in order to close the opening 22. The arch 30 is held, by means of a bearing 34, on a rail 24 attached to the frame 20 and is mounted so as to be movable along the rail 24. For easier and safer handling, the arch 30 comprises, by way of example, an operating lever 32 or a different handle.

In the closed position, the arch 30 is releasably locked such that, by means of both the bearing 34 and a suitable locking mechanism 36, the frame 20 and the closed arch 30 form a mechanically stable and robust structure that surrounds the mounting position and/or the rotor 60. In the embodiment of the invention shown, the locking mechanism 36 is formed, by way of example, as a clamping locking mechanism which can be pretensioned by means of an eccentric tension lever 37 and then frictionally locks the arch 30 in the closed position.

For balancing, the rotor 60 is rotated about the provided axis of rotation 62. This takes places by means of a motor 48, which is attached to the frame and drives a closed or endless drive belt 4 by means of a belt pulley 49. The drive belt 4 is guided over guide rollers 40, 41, 42 on the frame 20 and/or the arch 30 such that belt 4 winds around the rotor 60 in a cylindrical region and the rotor is thus driven by the looping belt 4.

In the embodiment of the invention shown by way of example, the belt 4 is in particular guided over the rotor 60 between a first guide roller 40 on the arch 30 and a second guide roller 41. Depending on the loop direction of the belt, the belt therefore runs from the first guide roller 40 upwards, then over the rotor, and down again to the second guide roller 41, or vice versa.

Further guide rollers 42, 43 are provided and suitably arranged to guide the belt in a closed loop and in a defined manner between the first guide roller 40, the belt pulley 49 and the second guide roller 41. The guide rollers 42 and 43 are arranged, by way of example, on the arch such that the belt is guided around the outside of the rotor 60 at a sufficient distance.

The first guide roller 40 on the arch 30 is arranged, for example, on the free end of the arch 30, i.e. in particular on the end thereof opposite the bearing 34. Movement of the closed position of the arch 30 leads to movement of the first guide roller 40 and to the belt being guided to and/or from the rotor 60 in a different manner. In particular, it is made possible in this respect to adjust the guiding of the belt to the diameter of the rotor 60 such that it is in particular made possible to particularly advantageously guide the belt vertically between the first guide roller 40 and the rotor 60 for any desired rotor diameters.

In the case of the drive apparatus 10 according to the invention that is shown by way of example, the desired closed position of the arch 30 can be reproducibly specified by means of a movable stop 26 on the frame 20, it being possible, even after the stop 26 has been moved, to reset a previously defined closed position to a high degree of precision by means of, for example, a scale 28 along the movement path. A structurally simple solution consists, by way of example, in moving the stop 26, which has a suitable securing device 26', continuously along a slot 28 and fixing said stop in the desired position by tensioning the stop 26 and the securing element 26' in the slot.

In a comparable manner, in the case of the embodiment shown, the guiding of the belt between the rotor 60 and the second guide roller 41 can be adjusted by the bearing of the second guide roller 41 on the frame 20 being designed so as to be movable. In this case too, a scale 47 may be provided to simplify the adjustment. A simple structural solution consists, by way of example, in releasably tensioning the shaft of the guide roller 41 in a slot 45 by means of a suitable securing device 44'.

A tensioning roller 44 of which the position can be changed is also provided in order to specify the tensioning of the belt. A comparably large adjustment range also makes it possible to cover a very wide range of possible rotor diameters by means of just a single belt 4 of a specified length.

Belt guide plates 46 on the guide rollers 40, 41, 42, 43 and on the tensioning roller 44 prevent the belt from jumping off unintentionally; however, said plates are preferably arranged so as not to touch the belt 4 as it loops as intended. Within the scope of the invention, said belt guide plates 46, which are shown by way of example, may also alternatively be designed as other kinds of retaining devices for the belt 4; retaining devices in general, and belt guide plates 46 in particular, are generally advantageous, but not essential to the invention.

A further advantage of the invention can be seen when the arch 30 is open. This position is shown in FIG. 3.

By means of the belt guide plate 46 on the guide roller 43, which roller is arranged on the bearing end of the arch 30, the belt 4 is carried along and loosely tautened in the region between the guide roller 42 and the tensioning roller 44 or the belt pulley 49 when the arch is opened. In place of the belt guide plate 46 on the guide roller 43, this advantage may also be achieved by any desired guide or retaining device arranged on the bearing end of the arch 30.

At the same time, the guide roller 43 picks the belt up in the region between the guide roller 40 and the guide roller 41 and further tautens the belt, though without tightly tensioning the belt 4. As a result, the belt 4 never sags and cannot therefore unintentionally become tangled or stuck either.

Figure 4:
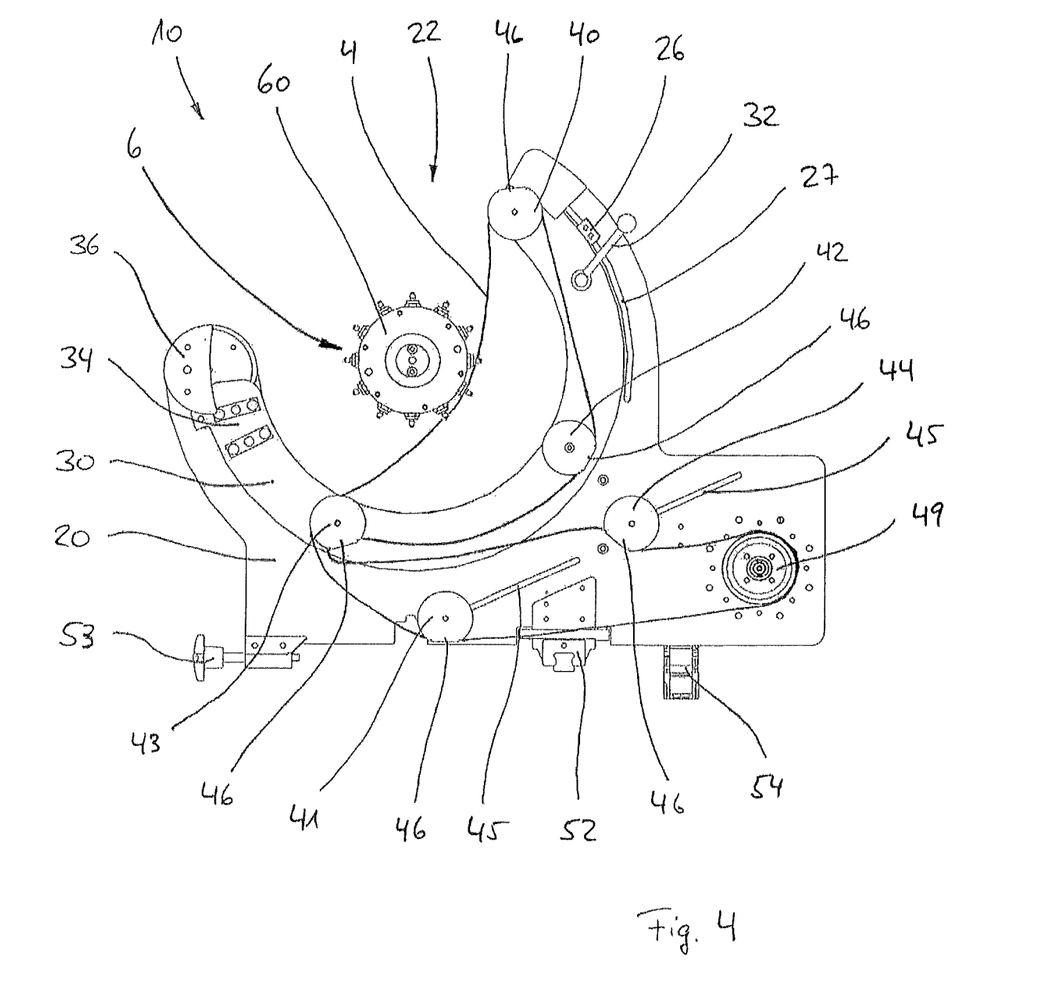
FIG. 4 shows the drive apparatus according to the invention, which is given by way of example and in which the arch has been opened, from a longitudinally axial point of view.

As can also be seen from the view in FIG. 4, the arch 30 does not project beyond the frame 20 in any position, apart from when the opening 22 is closed as intended, of course. The installation space occupied by the drive apparatus 10 is therefore not linked to the position of the arch 30. As a result, the protective hood 7 is advantageously prevented from colliding with the open arch 30.

Although only a few embodiments of the present invention have been shown and described, it is to be understood that many changes and modifications may be made thereunto without departing from the spirit and scope of the invention.

LIST OF REFERENCE NUMERALS 1 balancing machine
2 mounting device for the rotor
4 belt
6 mounting position for the rotor
7 protective case
8 workspace
9 protective hood
10 drive apparatus
20 frame
22 opening
24 rail
26 stop
26' securing device
27 slot
28 scale
30 arch
32 operating lever
34 bearing
36 locking mechanism
37 eccentric tension lever
40 guide roller
41 guide roller
42 guide roller
43 guide roller
44 tensioning roller
44' securing device
45 slot
46 guide plate
47 scale
48 motor
49 belt pulley
50 machine bed
52 linear guide
53 one-hand locking mechanism
54 cable guide
60 rotor
62 axis of rotation

What is claimed is:

1. A drive apparatus for a balancing machine for driving rotational movement of a workpiece, which is rotatably mounted about an axis of rotation, by means of a looping belt,
the drive apparatus comprising a frame which, transaxially to the axis of rotation, surrounds a mounting position for the workpiece at least in part, the frame having an opening which can be closed by means of an arch and through which the mounting position is accessible,
the drive apparatus comprising guide devices arranged on the frame and/or the arch, in order to guide the belt such that, when the arch is closed, the belt winds around a workpiece in the mounting position on a cylindrical circumferential region of said workpiece at least in part,
the drive apparatus further comprising a drive device for the belt, wherein the arch is held on the frame so as to be movable between an open position and a closed position, and
wherein the arch is held, by means of a bearing, on a rail attached to the frame and is mounted so as to be movable along the rail.

2. The drive apparatus according to claim 1, wherein the mass distribution of the arch and all the components of the drive apparatus that are movable together with the arch are balanced such that the gravitational torque acting on account of the mass distribution is not sufficient to overcome a frictional force acting counter to movement of the arch.

3. The drive apparatus according to claim 1, wherein a first of the guide devices is arranged on the arch, and a second of the guide devices is arranged on the frame, the belt used as intended being guided over the workpiece, mounted as intended, between the first guide device and the second guide device when the arch is closed.

4. The drive apparatus according to claim 1, wherein an arc-shaped sliding guide for the arch is arranged on the frame.

5. The drive apparatus according to claim 4, wherein the frame and the arch surround the mounting position for the workpiece substantially concentrically with the axis of rotation.

6. The drive apparatus according to claim 3, wherein a further guide device is arranged on the arch, the first guide device and the further guide device being arranged on opposite regions of the arch.

7. The drive apparatus according to claim 5, wherein the opening in the frame corresponds to between 100° and 130° of the transaxial periphery of the axis of rotation, the closed position of the arch being designed so as to be adjustable within an adjustment range, which corresponds to at least 45° of the transaxial periphery of the axis of rotation.

8. A balancing machine for balancing a workpiece, comprising a mounting apparatus in order to rotatably mount the workpiece about an axis of rotation in a mounting position, and comprising the drive apparatus according to claim 1.

9. The balancing machine according to claim 8, wherein the balancing machine further comprises a protective case, which surrounds at least the mounting apparatus, the mounting position for the workpiece and the drive apparatus and has a loading and unloading opening, and a cover device for covering the loading and unloading opening.

\* \* \* \* \*